(12) United States Patent
Jutzi et al.

(10) Patent No.: US 8,019,939 B2
(45) Date of Patent: Sep. 13, 2011

(54) DETECTING DATA MINING PROCESSES TO INCREASE CACHING EFFICIENCY

(75) Inventors: Curtis Edward Jutzi, Lake Oswego, OR (US); Dale Juenemann, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 533 days.

(21) Appl. No.: 12/131,735

(22) Filed: Jun. 2, 2008

(65) Prior Publication Data

US 2009/0300280 A1 Dec. 3, 2009

(51) Int. Cl.
*G06F 12/00* (2006.01)
*G06F 13/00* (2006.01)
*G06F 13/28* (2006.01)

(52) U.S. Cl. ............................ 711/113; 711/E12.019
(58) Field of Classification Search .................. 711/113, 711/E12.019
See application file for complete search history.

(56) References Cited

U.S. PATENT DOCUMENTS

| 7,130,890 | B1 * | 10/2006 | Kumar et al. ................. 709/218 |
| 7,328,192 | B1 * | 2/2008 | Stengard et al. ................ 706/12 |
| 7,694,075 | B1 * | 4/2010 | Feekes, Jr. .................... 711/119 |
| 2002/0095532 | A1 * | 7/2002 | Surugucchi et al. ............. 710/5 |
| 2003/0145186 | A1 * | 7/2003 | Szendy et al. ................ 711/173 |
| 2003/0195940 | A1 * | 10/2003 | Basu et al. .................... 709/213 |
| 2004/0215656 | A1 * | 10/2004 | Dill et al. .................. 707/103 R |
| 2005/0022201 | A1 * | 1/2005 | Kaneda et al. ................ 718/104 |
| 2005/0177549 | A1 * | 8/2005 | Hornick ........................... 707/1 |
| 2008/0195404 | A1 * | 8/2008 | Chron et al. ..................... 705/1 |
| 2009/0006876 | A1 * | 1/2009 | Fukatani et al. ............. 713/320 |
| 2009/0077302 | A1 * | 3/2009 | Fukuda ......................... 711/103 |
| 2009/0150511 | A1 * | 6/2009 | Gross et al. ................... 709/213 |
| 2009/0187713 | A1 * | 7/2009 | Zedlewski et al. ............ 711/130 |

* cited by examiner

*Primary Examiner* — Sheng-Jen Tsai
(74) *Attorney, Agent, or Firm* — Blakely, Sokoloff, Taylor & Zafman LLP

(57) ABSTRACT

Methods and apparatus to detect a data mining process are presented. In one embodiment the method comprising monitoring access of a process to a resource and classifying if the process is a data mining process based on at least one of a plurality of monitored values, such as an access rate, an eviction rate, and an I/O consumption value.

16 Claims, 8 Drawing Sheets

DETECTING DATA MINING PROCESSES TO INCREASE CACHING EFFICIENCY

FIELD OF THE INVENTION

Embodiments of the invention relate to data storage in computer systems; more particularly, embodiments of the invention relates to detecting data mining processes and coordinating transfer of data to increase efficiency of a caching system.

BACKGROUND OF THE INVENTION

Semiconductor technologies have advanced rapidly over the past decades. However, disk storage (e.g., hard drives) has not kept pace with computer main memories (e.g. DRAM) in terms of access speed. Although the storage capacity of magnetic disks increased dramatically, their mechanical nature remains a weakness to disk access speed. The result is a wider speed gap between main memories and disk storage in a computer system. On the other hand, the main memories have also failed to track on the speed of processors, resulting to another speed gap between main memories and processors. As a result, a processor has to wait for a substantial amount of time for data access operations due to the speed gaps. The waiting time has since become a serious penalty to the performance of computer systems.

Caching is a main mechanism for reducing access latency. A memory storage subsystem can include one or more layers of memory cache to plug the performance gap between processors and main memories. For example, many computer systems nowadays have at least three levels of memory caches between a processor and a main memory. In a similar way, modern file systems generally use large non-volatile caches to speed up storage drive access. In recent development, solid state disk with non-volatile memory technology, acting as a new layer of disk, are deployed between main memories and storage drives (e.g. hard drives). Non-volatile random access memory (NVRAM) is the general name used to describe any type of random access memory which does not lose its information when power is turned off. The non-volatile cache handles the data most frequently written to or retrieved from storage and can also effectively increase the capacity of the drive. The non-volatile cache can be an integrated part of a hard disk, external to a hard disk but contained in the housing of a hard disk, or entirely external to a hard disk.

The cache technology increases the performance of the data storage system and enhances the overall system responsiveness. The additional layer of disk cache can store duplicates of frequently-used data from a main storage drive, therefore dramatically reduce the number of times a system needs to burn power and waste time finding small bits of data scattered across the main storage drive. The solid state disk also enables the system to store boot and resume information in a cache.

The efficiency of a caching mechanism is mostly exploited when the cache is occupied with data that are accessed frequently. In an adverse situation, after a long series of sequential accesses to one-time-use-only (cold) data blocks, many frequently accessed data blocks may be evicted out from the cache immediately, leaving all these cold blocks occupying the cache for an unfavorable amount of time and thus resulting in a waste of the memory resources. A solid state disk acting as a disk cache may also suffer the same negative impacts in such situation.

Data access activities to or from a storage drive that involves storing a large data workload in a cache while discarding the data workload without reusing the data workload is often known as cache thrashing. Such data access activities are often from applications referred to as cache thrashing applications. Having large cache capacity can quickly become irrelevant if I/O requests coming from cache thrashing applications exceed the size of the disk cache. To increase the performance of a cache, it is important to retain the data that are frequently accessed and to remove data that will not be required in the near future (e.g., data that are only required once). It would be greatly useful to identify such applications that exhibit cache thrashing behaviors and subsequently prevent storing data requested by these applications in the disk cache to increase the efficiency of usage.

A data mining process (DMP) herein refers to a computer process that performs disk requests (or other memory access requests) to random locations in a data storage (e.g., storage drive, main memory) and the results requested by the process are rarely re-used. The workload requested by the process is relatively large as compared to the capacity of a caching mechanism in place, causing reusable data from the cache to be evicted if the results of the disk requests are cached. Such computer processes exist in and not limited to applications such as computer virus scan applications, file indexing application, data mining applications, disk scanning applications, and file streaming applications. For example, a virus scanner process randomly scans all the files on a storage drive. The disk requests from the virus scanner process, if cached, would cause the disk cache, which stores most recently used data, flushed with one-time-use-only data during the scanning process occurs. Some sequential streaming applications can be detected by examining the addresses of a series of disk requests. If the series of disk requests are accessing consecutive locations on a storage drive, the process is most likely a sequential streaming application. A data mining process is not easily detectable using the same technique as the process may raise disk requests to random locations in a computer storage.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of methods and apparatuses are disclosed for detecting a data mining process in a computer system. In one embodiment, a computer system detects whether a process exhibits a data access pattern akin to a data mining process by monitoring a number of parameters, and thereafter classifies the process as a data mining process (DMP) if the process matches a set of conditions qualified with respect to those parameters. The transfer of data for such a process can be performed without going through a cache in the computer system to avoid thrashing the cache with rarely used data. In one embodiment, the result of a load operation for the process identified as a DMP is retrieved from storage drive interface to a main memory directly; whereas the result of a store operation for the process is written from a main memory to a storage drive interface directly, bypassing the cache, to prevent evicting hot-blocks in the cache.

In one embodiment, a system process with a predetermined process identifier (PID) performs I/O disk requests on behalf of other applications, having a data access pattern akin to a DMP therefrom, is also detected as a DMP.

Cache mechanisms referred herein are not limited to memory caches and disk caches only. A disk cache can be implemented in many ways including a NVRAM solid state disk, a region on a hard disk reserved for the on-disk cache purpose, external NVRAM on chipsets or a motherboard (such as flash RAM), a flash thumb drive connected via an I/O interface, and many other memory devices. Embodiments presented herein uses a disk cache or a non-volatile cache as examples for illustration purpose, persons skilled in the art would be able to adopt the techniques disclosed and apply, with suitable adaptations, to other cache mechanisms in computer systems. Embodiments may be used in conjunction with multi-core processors where bus/memory contention among the many cores leads to increased latency to service requests to storage drives.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "classifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

Figure 1:
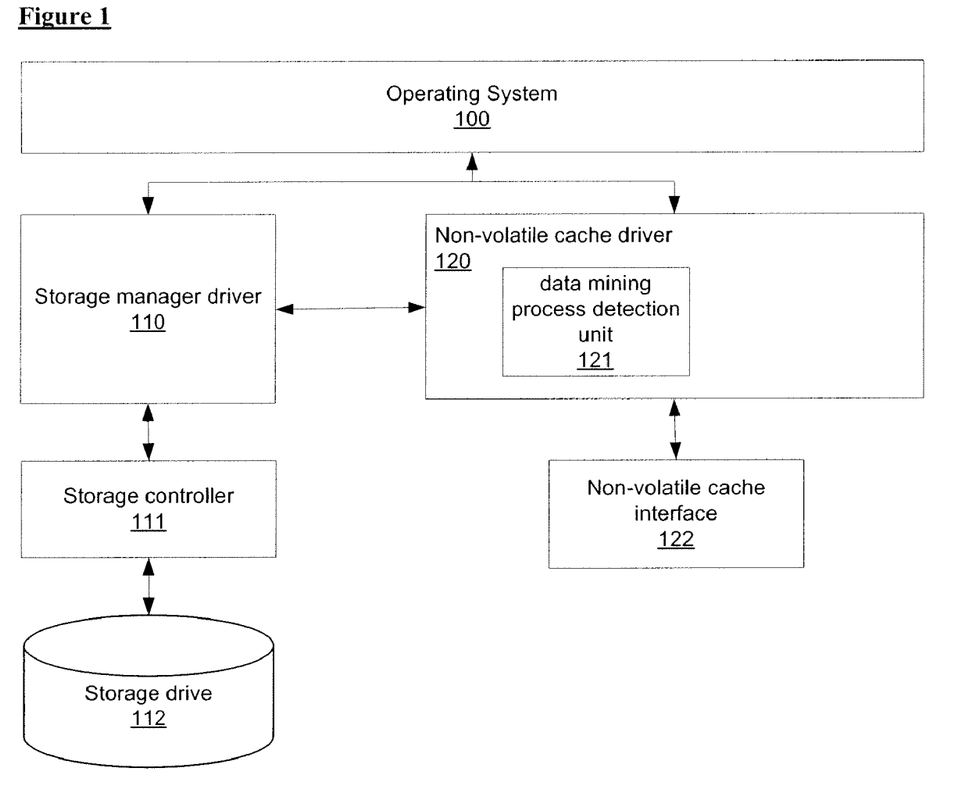
FIG. 1 is a block diagram of one embodiment of a computer storage system.

FIG. 1 is a block diagram of one embodiment of a computer storage system. Many related components such as buses and peripherals have not been shown to avoid obscuring the embodiment of the invention. Referring to FIG. 1, the computer storage system comprises operating system 100, storage manager driver 110, storage drive 112, non-volatile cache driver 120, and non-volatile cache interface 122. Non-volatile cache driver 120 further includes data mining process detection unit 121.

In one embodiment, operating system 100 acts as a manager of the computer storage system and handles most of the disk requests to storage drive 112 and non-volatile cache unit (not shown). Operating system 100 communicates with storage manager driver 110 and non-volatile cache driver 120 to perform disk access operations. Operating system 100 encompasses other computer processes running thereon which may issue disk requests to the two drivers (i.e., storage manager driver 110 and non-volatile cache driver 120), with or without interference from operating system 100. In one embodiment, each process has a process identifier (PID) assigned by operating system 100. In one embodiment, operating system 100 also encompasses a system process, with a system process identifier (SPID), that takes over the disk requests from processes of other applications. In one embodiment, a process from an application can issue a request to the system process to perform disk access operations on behalf of the application's process. The system process can manage a number of disk requests from different applications to reduce, and potentially minimize, the number of total disk requests. The system process can re-arrange disk requests so that those accessing consecutive locations on a storage drive are performed in sequence. Some applications can also benefit from improved data latency time when operating system 100 predicts and pre-fetches some of the data required.

In one embodiment, storage manger driver 110 interfaces with storage controller 111 to access storage drive 112. Non-volatile cache driver 120 receives requests from processes of operating system 100 and other applications. Non-volatile cache driver 120 further includes data mining process detection unit 121 to detect if a process (with a PID assigned) is a data mining process (DMP). The detection mechanism will be described in further detail below with additional references to the remaining figures.

In one embodiment, non-volatile cache driver 120 sends the requests to non-volatile cache interface 122, which acts as an interface to the controllers of one or more non-volatile caches. In one embodiment, non-volatile cache interface 122 is a PCI Express interface. In other embodiment, non-volatile cache interface 122 can be a socket-based interface on a motherboard or any other input/output (I/O) interfaces available to a computer system. In one embodiment, frequently-accessed data or recently-used data from storage drive 112 are cached in a non-volatile cache. The non-volatile cache can be a solid state disk, a flash drive, or other NVRAM devices.

In one embodiment, non-volatile cache driver 120 anticipates which disk blocks will be needed from storage drive 112 and stores them in the non-volatile cache ahead of time. These data blocks can persist even when the power to the system is disrupted, such as, for example, during a computer reboot event. When requested by operating system 100, the data blocks are transferred from non-volatile cache (with low latency time) rather than from the much higher-latency storage drive 112. In one embodiment, storage manager driver 110 sends disk requests to non-volatile cache driver 120 if the data blocks are available from a non-volatile cache. In one embodiment, non-volatile cache driver 120 redirects disk requests by operating system 100 to storage manager 110 to bypass the caching mechanism if the disk requests are raised by a DMP.

In one embodiment, for write commands, data is buffered in a non-volatile cache and later written to storage drive 112 to reduce, and potentially minimize, unnecessary disk access. In one embodiment, the configurations for the caches range from 128 MB up to 4 GB in size.

Figure 2:
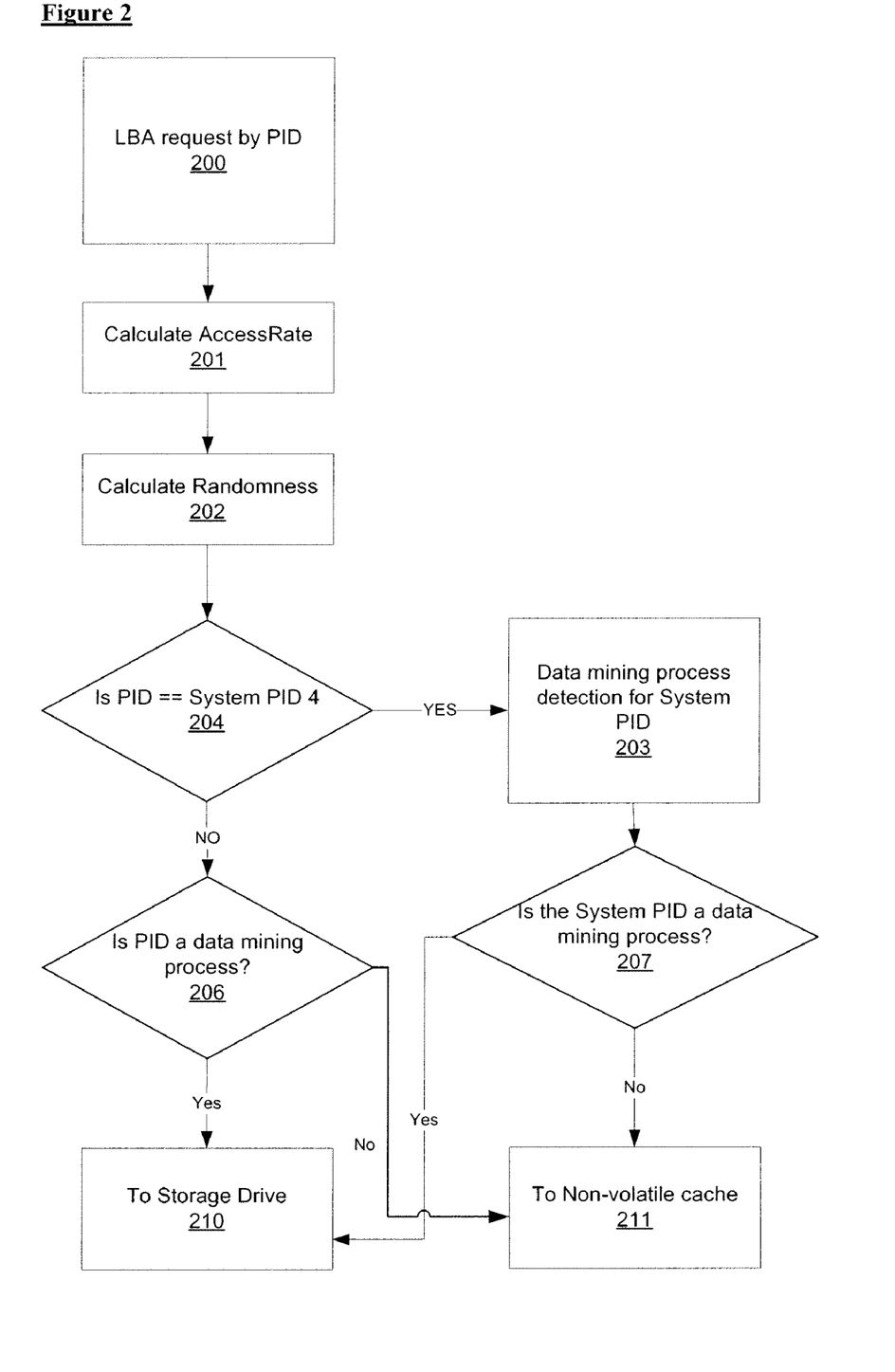
FIG. 2 shows a flow diagram of one embodiment of a process for detecting a data mining process in a computer system with a non-volatile cache.

FIG. 2 shows a flow diagram of one embodiment of a process for detecting a data mining process in a computer system with a non-volatile cache. The procedure is performed by processing logic that may comprise hardware (circuitry, dedicated logic, etc.), software (such as is run on a general purpose computer system or a dedicated machine), or a combination of both.

Referring to FIG. 2, the process begins by processing logic receiving a logical block address (LBA) request from a computer process (processing block 200). An LBA is a logical address which is mapped to the physical address of storage drives. In one embodiment, the LBA maps directly to a sector of 512 bytes. In other embodiments, a disk request can be presented in other address formats such as a virtual I/O address.

In one embodiment, the processing logic calculates an access rate (processing block 201) and a randomness value (processing block 202) for the computer process. In one embodiment, the access rate is a sampled access rate (number of accesses over a period of time) during the sample period (Tpid). A disk access from an operating system or applications comprises one or more LBA requests. A disk access usually starts with a first LBA request, followed by a number of subsequent LBA requests to read or to write data from or to, respectively, a storage drive. In other embodiment, the access rate can be determined in other ways to substantially represent the number of disk requests or memory access requests over a period of time.

In one embodiment, the processing logic calculates delta values (difference) between the LBA of a current disk request and the LBA of a previous disk request of the computer process. The randomness value is defined as the running average of the delta values. In other embodiments, any value that substantially indicates the variation of disk access locations or memory access locations over a period of time may be used. In one embodiment, the sample period (Tpid) is defined as the time since the last disk access. In one embodiment, the calculation of the access rate and the randomness value is performed by other entities in the computer system.

In one embodiment, if a process is a system process and has been assigned a predetermined system process identifier (SPID) (processing block 204), the processing logic determines whether the system process is a DMP at processing block 203 which will be described in further detail below with additional references in FIG. 4. Otherwise, if the process does not match the predetermined system process identifier (SPID), the processing logic determines whether the process is a DMP at processing block 206, which will be described in further details below with additional references in FIG. 3. If the process is classified as a DMP, the disk requests of the process (either to write or to read) will be redirected to a storage drive (processing block 210). Otherwise, the disk requests will be cached (processing block 211). Similarly, if the system process is classified as a DMP (processing block 207), the disk requests of the process (either to write or to read) will be redirected to a storage drive (processing block 210). Otherwise, the disk request for the system process will be cached (processing block 211).

In one embodiment, computer processes are monitored continuously by repeating the process in FIG. 2. In other embodiments, the detection mechanism can be invoked for every disk access event. Although described herein as separate processing blocks, processing block 203 and processing block 206 may be combined into a single processing block that performs the function of determining if a computer process is a DMP. In different embodiments, processing block 203 and processing block 206 can be performed independently.

Figure 3:
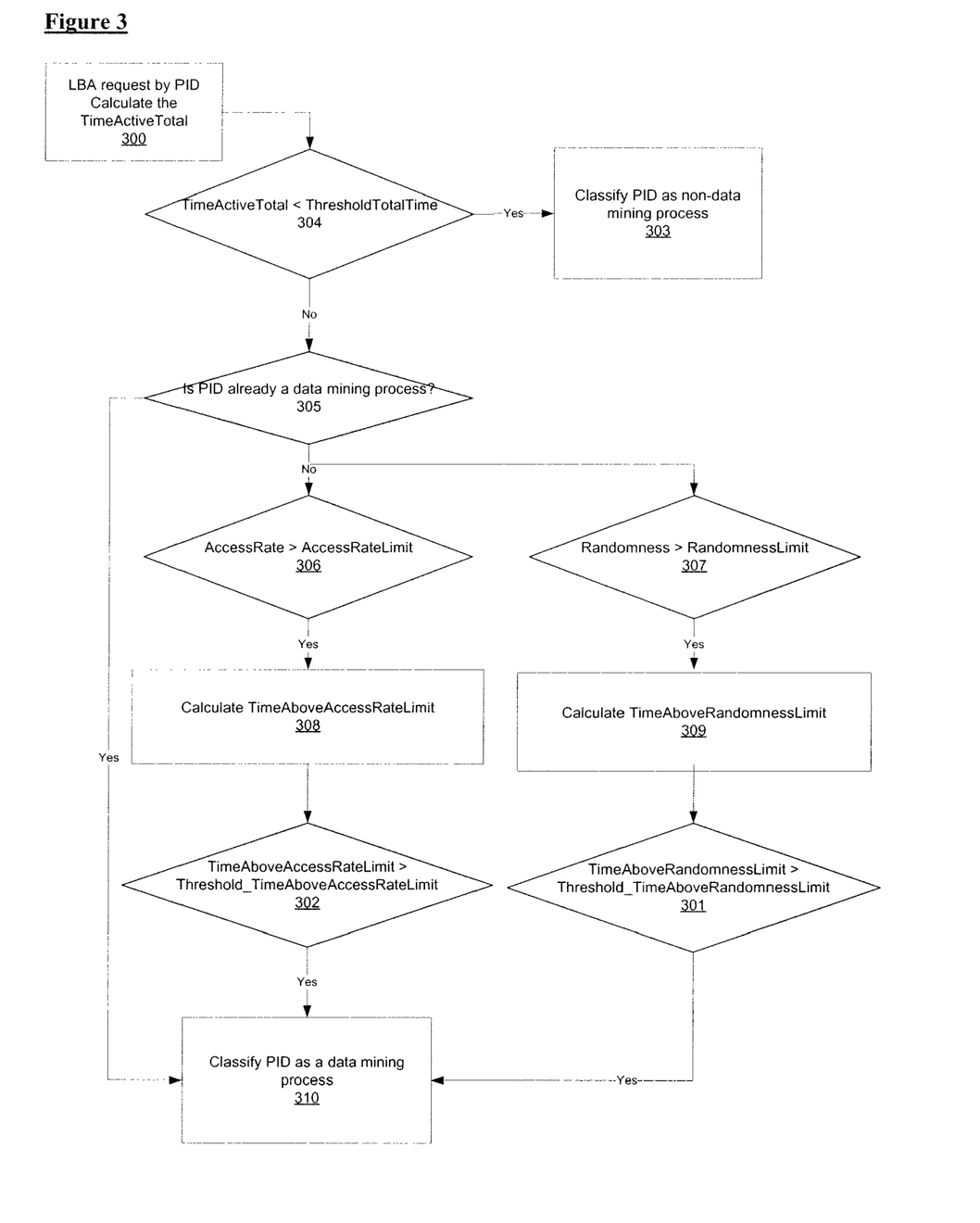
FIG. 3 is a flow diagram of one embodiment of a process for detecting a data mining process.

FIG. 3 is a flow diagram of one embodiment of a process for detecting a data mining process. Referring to FIG. 3, the process begins by processing logic computing a total of active time of a computer process (processing block 300). In one embodiment, the active time of a computer process refers to the time period during which the process is accessing a storage drive. In one embodiment, the process logic compares the total active time to a threshold value (processing block 304). If the total active time is lower than the threshold value, the process is classified as a non-DMP (processing block 303); otherwise, the processing logic continues to determine if the process has been classified as a DMP. This is achieved by checking whether the PID has already been classified as a data mining process (processing block 305). In one embodiment, processing logic determines whether the process has been previously classified as a DMP process by searching the PID of the computer process in a list constituting of DMPs. If the computer process has been a DMP, the computer process is classified as a DMP (processing logic 310). Otherwise, if the PID of the process is not in the list of DMP, the processing logic proceeds in two concurrent processing paths. A computer process will be classified as a DMP (processing block 310) if a total time for which the access rate of the process is higher than a predetermined access rate limit is monitored (processing block 306 and 308) and the total time is longer than a predetermined time period (processing block 302). The computer process will also be classified as a DMP if a total time for which the randomness value of the process is higher than a predetermined randomness value limit is monitored (processing block 307 and 309) and the total time is longer than a predetermined time period (processing block 301).

In one embodiment, computer processes are monitored continuously by repeating the process in FIG. 3. In other embodiments, the detection mechanism can be invoked for every disk access event. In one embodiment, the active total time is an optional criterion. In one embodiment, the comparison of access rate and the randomness value can be performed jointly or independently. Although described herein as one embodiment, the two comparisons (randomness value and access rate) can be performed independently in separate embodiments.

Figure 4:
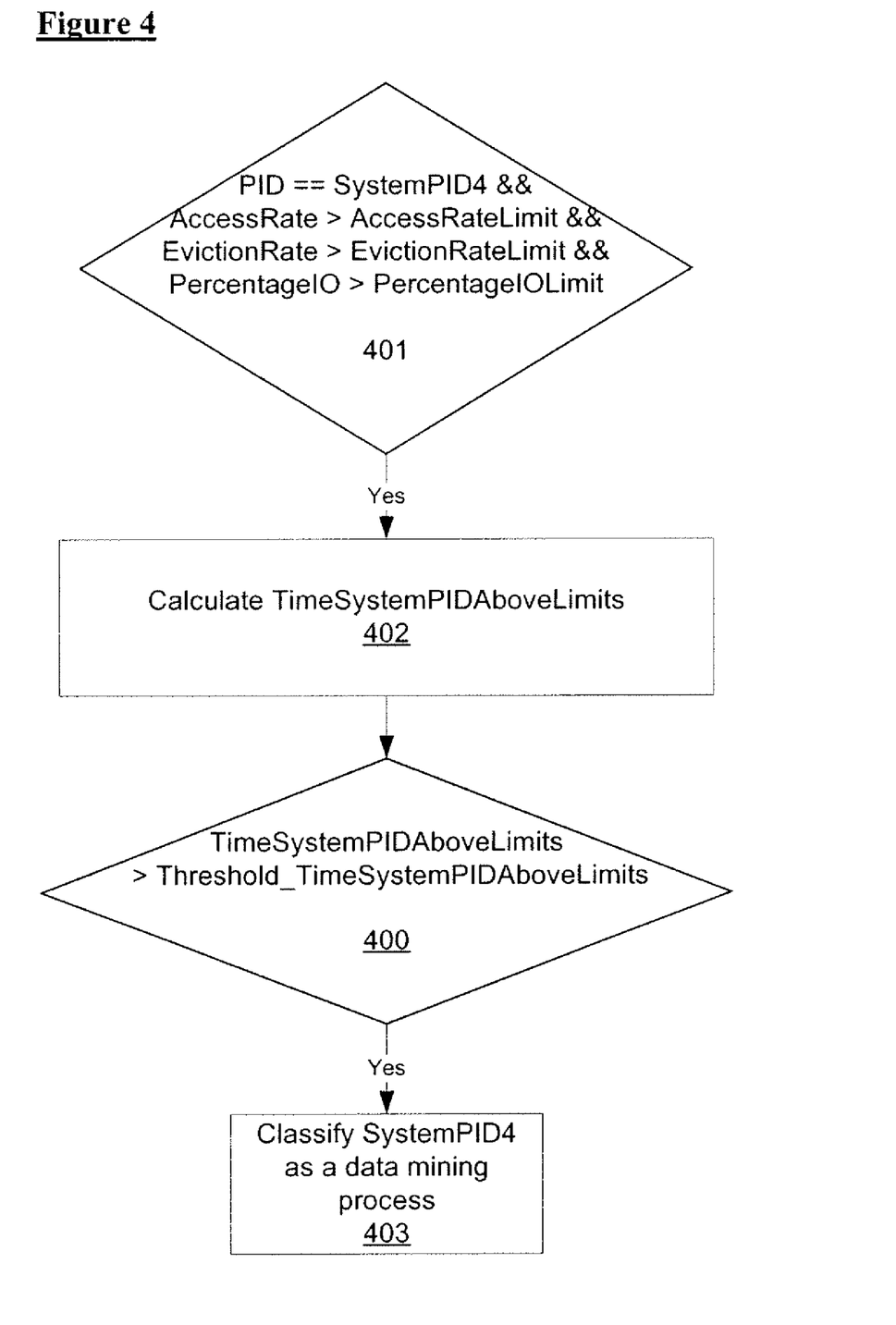
FIG. 4 is a flow diagram of one embodiment of a process for detecting a data mining process with a predetermined system process identifier.

FIG. 4 is a flow diagram of one embodiment of a process for detecting a data mining process with a predetermined system PID (SPID). As explained in earlier sections, in some embodiments, operating systems perform pre-fetch on requested files to optimize I/O for the system. Pre-fetching can be performed by one or more specific system processes (assigned with a SPID) on behalf of other processes from various applications.

In one embodiment, the SPID of the system process that performs disk requests for other application is "4". Referring to FIG. 4, processing logic starts by comparing an access rate, an eviction rate, an I/O consumption value to their threshold values, respectively (processing block 401). The access rate has been described in detail description for FIG. 2.

In one embodiment, an eviction rate is computed as the current ratio of the number of pages evicted from a cache to the number of I/O pages available in the cache, during a sample period (Tpid). In other embodiments, the eviction rate refers to a number substantially represents a ratio of a number of data blocks evicted to a total number of data blocks available in a cache over a time period.

In one embodiment, I/O consumption value is computed as the percentage of I/O disk requests performed by the system process over the total of disk requests during a sample period (Tpid). In other embodiments, the I/O consumption value is computed in other ways to substantially represent a proportion of I/O consumption that the system process is accounted for.

In one embodiment, the processing logic computes a total of time (TimeSystemPIDAboveLimits) for which the access rate, the eviction rate, the I/O consumption value are higher than their predefined limits respectively (processing block 402). Processing logic tests whether if the total of time is higher than a predetermined threshold value (processing block 400), the system process is classified as a DMP if the total of time is higher than the predetermined threshold value (processing block 403).

In one embodiment, the predefined limit of the access rate is referred to herein as AccessRateLimit, the predefined limit of the eviction rate is referred to herein as EvictionRateLimit, and the predefined limit of the I/O consumption value is referred to herein as PercentageIOLimit. In one embodiment, the threshold for the total of time is referred to herein as Threshold_TimeSystemPIDAboveLimits.

In one embodiment, computer processes are monitored continuously by repeating the process in FIG. 4. In other embodiments, the detection mechanism can be invoked for every disk access event. In one embodiment, some of the criteria for comparison (access rate, eviction rate, and I/O consumption value) in processing block 401 can be excluded. In one embodiment, the calculation of these parameters can be performed by other entities in the computer system.

A system process is usually a process executing continuously (actively or inactively) on a computer system to provide services to other applications running thereon. In one embodiment, a system process also handles paging management, system level disk requests, and other disk requests involving frequently-accessed data that may be more efficient if stored in a cache. Hence, a system process can change its behavior from a DMP and to a non-DMP (vice versa) based on the types of disk requests the system process is performing.

Figure 5:
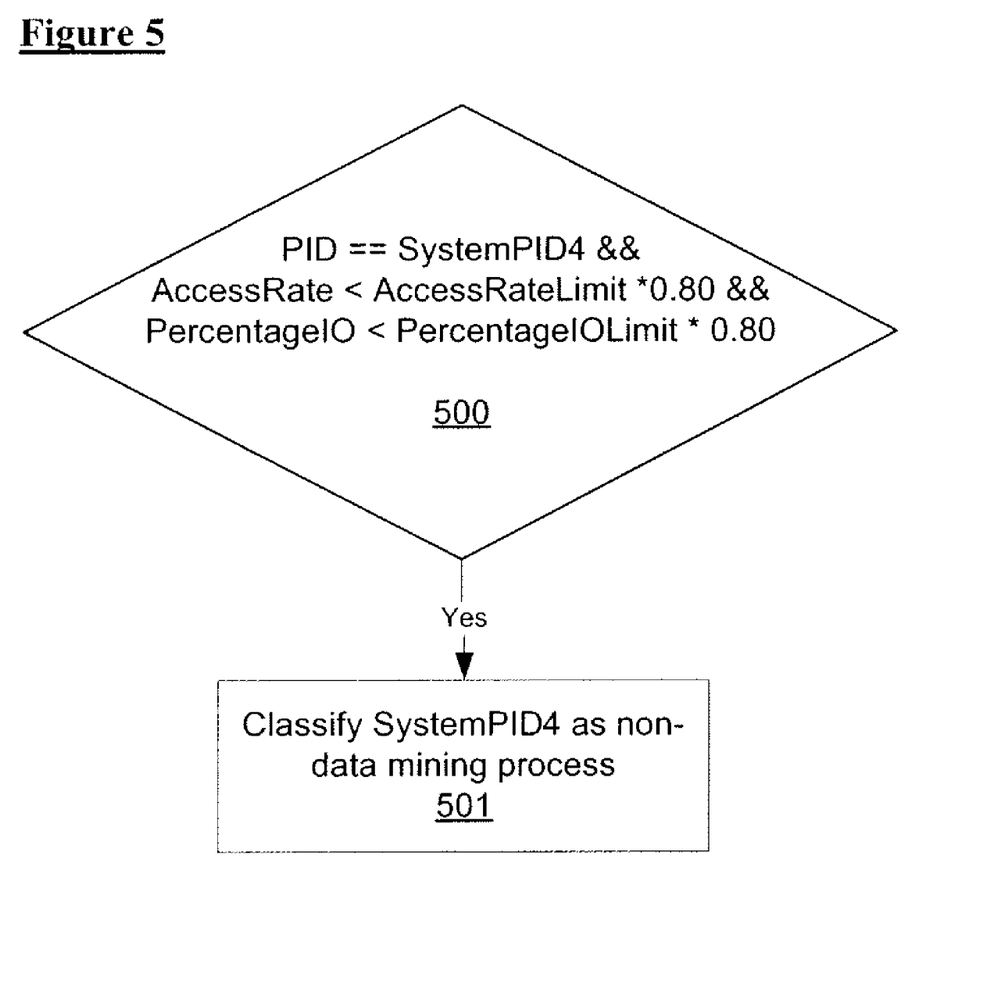
FIG. 5 is a flow diagram of one embodiment of a process for re-classifying a computer process with a predetermined system process identifier as a non-data mining process.

FIG. 5 is a flow diagram of one embodiment of a process for re-classifying a system process with as a non-data mining process. In one embodiment, the process logic determines whether a system process is a specific system process that provides disk request services (e.g., pre-fetching from a storage drive). In one embodiment, the system process that performs disk requests for other application is assigned with a SPID 4. The processing logic classifies the system process as a non-DMP if the access rate of the system process is lower than 0.8 of the AccessRateLimit and the I/O consumption value is lower than 0.8 of the PercentageIOLimit (processing block 500).

In one embodiment, the value of 0.8 can be replaced with 0.9 or other suitable values. In one embodiment, other relevant criteria such as eviction rate may be included in the comparison in processing block 500. Considering the embodiments disclosed in FIG. 4 and FIG. 5, the embodiment shown in FIG. 4 is referred to herein as an entrance procedure, whereas the embodiment disclosed in FIG. 5 is referred to herein as an exit procedure. In one embodiment, teachings in FIG. 3, FIG. 4, and FIG. 5 can be jointly performed to detect a DMP in a computer system.

Figure 6:
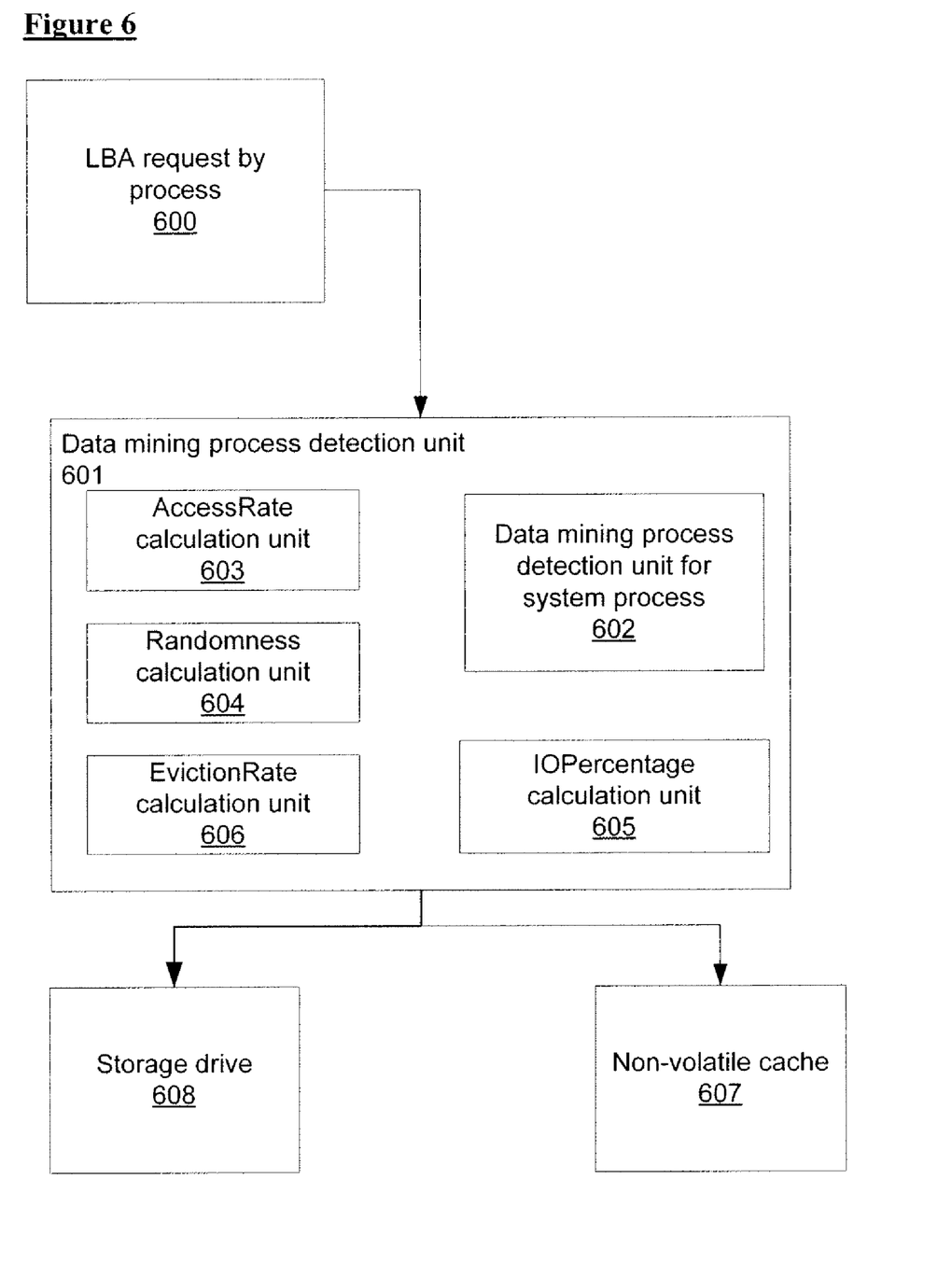
FIG. 6 is a block diagram of one embodiment of a data mining process detection unit.

In one embodiment, the thresholds and the limits can be set accordingly to:
  SPID=4 for a specific operating system
  access rate threshold=1,000 accesses/second
  randomness threshold=30,000,000
  EvictionRateLimit=0.95
  PercentageIOLimit=0.95
  Threshold_TimeSystemPIDAboveLimits=20 seconds FIG. 6 is a block diagram of one embodiment of a data mining process detection unit. Referring to FIG. 6, the data mining process detection unit 601 comprises access rate calculation unit 603, randomness calculation unit 604, eviction rate calculation unit 606, data mining process detection unit for system process 602, and I/O consumption calculation unit 605. Data mining process detection unit 601 receives information of LBA disk request 600 from different processes executing on a computer system. The calculation units (603, 604, 605, and 606) compute the related values of a process or a system process for further processing in data mining process detection unit 601 and data mining process detection unit for system process 602. In one embodiment, data mining process detection unit 601 performs the functions described in conjunction with the embodiment of FIG. 3. In one embodiment, data mining process detection unit for system process 602 performs the functions described in conjunction with the embodiments of FIG. 4 and FIG. 5. Based on the result of classification from DMP detection units (601, 602), LBA requests can be sent to storage drive 608 or non-volatile cache 607 accordingly.

Although described herein as processing logic, each of the calculation units and each of the DMP detection units can be implemented independently, separately or externally in different combinations.

Embodiments of the invention may be implemented in a variety of electronic devices and logic circuits. Furthermore, devices or circuits that include embodiments of the invention may be included within a variety of computer systems.

Embodiments of the invention may also be included in other computer system topologies and architectures.

Figure 7:
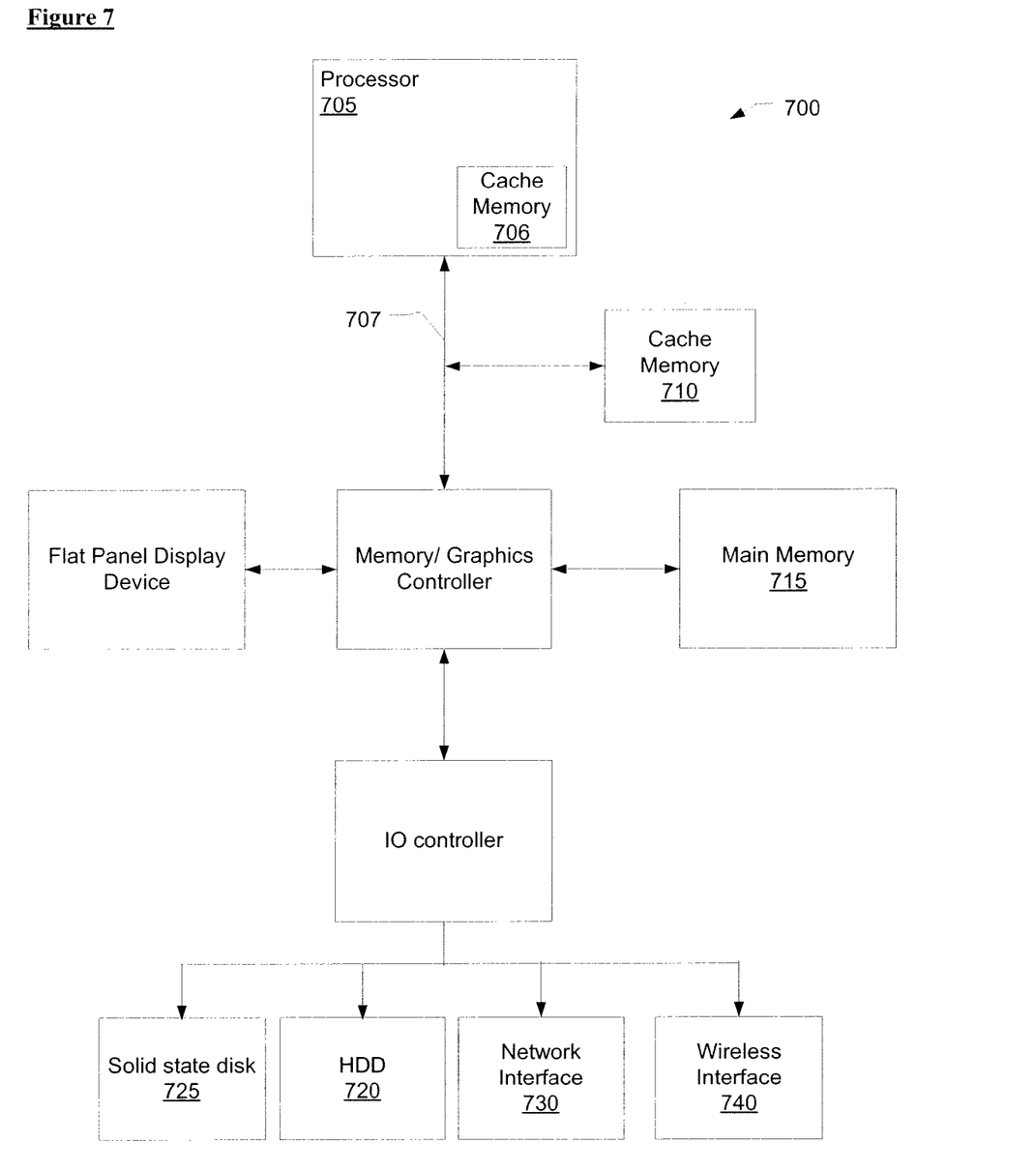
FIG. 7 illustrates a computer system in which one embodiment of the invention may be used.

FIG. 7, for example, illustrates a front-side-bus (FSB) computer system in which one embodiment of the invention may be used. A processor 705 accesses data from a level 1 (L1) cache memory 706, a level 2 (L2) cache memory 710, and main memory 715. In other embodiments of the invention, the cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have the cache memory 710 as a shared cache for more than one processor core.

The processor 705 may have any number of processing cores. Other embodiments of the invention, however, may be implemented within other devices within the system or distributed throughout the system in hardware, software, or some combination thereof.

The main memory 710 may be implemented in various memory sources, such as dynamic random-access memory (DRAM), a hard disk drive (HDD) 720, a solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 7. Furthermore, in other embodiments of the invention may be distributed throughout several circuits, logic units, or devices illustrated in FIG. 7.

Figure 8:
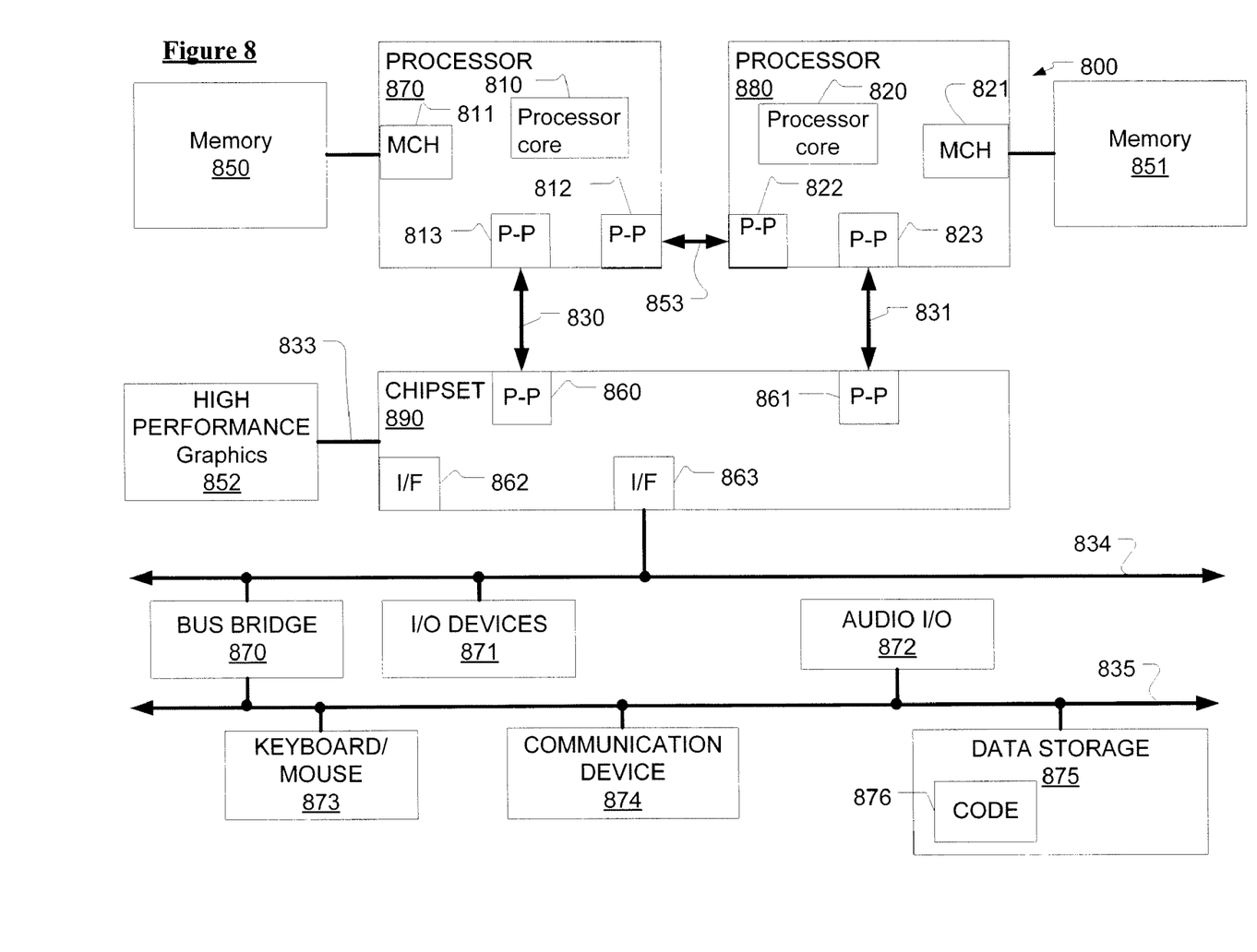
FIG. 8 illustrates a point-to-point computer system in which one embodiment of the invention may be used.

Similarly, at least one embodiment may be implemented within a point-to-point computer system. FIG. 8, for example, illustrates a computer system that is arranged in a point-to-point (PtP) configuration. In particular, FIG. 8 shows a system where processors, memory, and input/output devices are interconnected by a number of point-to-point interfaces.

The system of FIG. 8 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or within data storage 875, or within memory 850 of FIG. 8.

Other embodiments of the invention, however, may exist in other circuits, logic units, or devices within the system of FIG. 8. Furthermore, in other embodiments of the invention may be distributed throughout several circuits, logic units, or devices illustrated in FIG. 8.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method for detecting a data mining process comprising:
    monitoring access of a process to a resource;
    classifying whether the process is a data mining process or not based on at least one of a plurality of monitored values that includes
        an access rate value associated with the process,
        an eviction rate value associated with the process, and
        an I/O consumption value associated with the process;
    determining a first time period when the access rate value is higher than a first limit, the eviction rate value is higher than a second limit, and the I/O consumption value is higher than a third limit; and
    classifying the process as a data mining process if the first time period exceeds a predetermined value.

2. The method of claim 1 further comprising:
    classifying the process as a non-data mining process if the access rate value is lower than a first threshold value and the I/O consumption value is lower than a second threshold value, wherein the first threshold value is lower than the first limit and the second threshold value is lower than the third limit.

3. The method of claim 2, further comprising computing the plurality of monitored values.

4. The method of claim 2, wherein the plurality of monitored values further includes a randomness value associated with the process.

5. The method of claim 4, further comprising:
    classifying the process, wherein the process does not have a predetermined system process identifier, as a data mining process if the process has the access rate value higher than a forth limit for a second period of time, or if the second process has the randomness value higher than a fifth limit for a third period of time.

6. The method of claim 1, wherein the plurality of monitored values further includes a randomness value associated with the process.

7. The method of claim 6, wherein the process is classified as a data mining process if the process has the access rate value higher than a first limit for a first period of time, and the process is classified as a data mining process if the process has the randomness value higher than a second limit for a second period of time.

8. The method of claim 7, further comprising comparing an active time value associated with the process to a threshold value to determine if the process is a data mining process.

9. The method of claim 7, further comprising transferring data, without storing the data in a cache, for the process if the process is classified as a data mining process.

10. The method of claim 7, further comprising computing the plurality of monitored values.

11. An apparatus for detecting a data mining process comprising:
    an access rate monitoring unit to determine an access rate value associated with a process;
    a randomness monitoring unit to determine a randomness value associated with the process;
    a data mining process detection unit coupled to determine whether the process is a data mining process based on the access rate value and the randomness value; and
    a second detection unit coupled to determine if a system process is a data mining process by:

determining a first time period when an access rate value associated with the system process is higher than a first limit, an eviction rate associated with the system process value is higher than a second limit, and an I/O consumption value associated with the system process is higher than a third limit; and classifying the system process as a data mining process if the first time period exceeds a predetermined value.

12. The apparatus defined in claim 11, wherein:
the system process identified as a data mining process is classified as a non-data mining process if the access rate value associated with the system process is lower than a first threshold value and the I/O consumption value associated with the system process is lower than a second threshold value, wherein the first threshold value is lower than the first limit and the second threshold value is lower than the third limit.

13. The apparatus defined in claim 11, further comprising a cache coupled to store a result of a hard disk access for the process if the process is classified as a non-data mining process.

14. An article of manufacture comprising:
a computer readable storage medium including data storing instructions thereon that, when accessed by a machine, cause the machine to perform a method comprising:
monitoring access of a process to a resource;
classifying if the process is a data mining process based on at least one of a plurality of monitored values, wherein the monitored values include:
an access rate value associated with the process;
a randomness value associated with the process;
an eviction rate value associated with the process; and
an I/O consumption value associated with the process;
determining a first time period when the access rate value is higher than a first limit, the eviction rate value is higher than a second limit, and the I/O consumption value is higher than third limit; and
classifying the process as a data mining process if the first time period exceeds a predetermined value.

15. The article of manufacture of claim 14 wherein the method further comprising:
classifying the process as a non-data mining process if the access rate value is lower than a first threshold value and the I/O consumption value is lower than a second threshold value, wherein the first threshold value is lower than the first limit and the second threshold value is lower than the third limit, wherein the process has a predetermined system process identifier.

16. The article of manufacture of claim 15 wherein the method further comprising:
classifying a second process, if second process does not has the predetermined system process identifier, as a data mining process if an access rate value associated with the second process is higher than a forth limit for a second period of time, or if a randomness value associated with the second process is higher than a fifth limit for a third period of time.

* * * * *